(12) United States Patent
de Ruyter et al.

(10) Patent No.: US 10,718,786 B2
(45) Date of Patent: Jul. 21, 2020

(54) FLOW CELL ASSEMBLY SECUREMENT SYSTEM AND METHOD

(71) Applicant: Ilumina, Inc., San Diego, CA (US)

(72) Inventors: Anthony John de Ruyter, San Diego, CA (US); Patrick Kehl, San Diego, CA (US); Thomas McGee, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 471 days.

(21) Appl. No.: 15/359,848

(22) Filed: Nov. 23, 2016

(65) Prior Publication Data

US 2018/0143216 A1    May 24, 2018

(51) Int. Cl.
| | |
|---|---|
| *G01N 35/04* | (2006.01) |
| *B01L 9/00* | (2006.01) |
| *B01L 3/00* | (2006.01) |
| *G01N 35/00* | (2006.01) |
| *G01N 35/10* | (2006.01) |

(52) U.S. Cl.
CPC ........ *G01N 35/04* (2013.01); *B01L 3/502715* (2013.01); *B01L 9/527* (2013.01); *B01J 2219/00286* (2013.01); *B01J 2219/00418* (2013.01); *B01J 2219/00527* (2013.01); *B01J 2219/00686* (2013.01); *B01J 2219/00702* (2013.01); *B01L 2200/025* (2013.01); *B01L 2200/026* (2013.01); *B01L 2200/0689* (2013.01); *B01L 2200/143* (2013.01); *B01L 2300/0877* (2013.01); *B01L 2300/123* (2013.01); *B01L 2300/18* (2013.01); *G01N 35/00029* (2013.01); *G01N 35/1095* (2013.01)

(58) Field of Classification Search
USPC ...................... 422/63, 65–66, 560–561, 563
See application file for complete search history.

(56) References Cited

U.S. PATENT DOCUMENTS

| | | | |
|---|---|---|---|
| 5,055,262 | A | 10/1991 | Sakagami |
| 5,175,086 | A | 12/1992 | Takekawa et al. |

(Continued)

FOREIGN PATENT DOCUMENTS

| | | |
|---|---|---|
| EP | 1898219 A2 | 3/2008 |
| EP | 1711264 B1 | 3/2010 |

(Continued)

OTHER PUBLICATIONS

PCT/US2017/061824, "International Search Report", dated Apr. 26, 2018, 7.

(Continued)

*Primary Examiner* — Brian R Gordon
(74) *Attorney, Agent, or Firm* — Illumina, Inc.

(57) ABSTRACT

A flow cell and cartridge assembly may be loaded into a processing system, such as for genetic sequencing. The system locates the assembly and is then actuated to move the assembly to a desired reference position in both X- and Y-directions. Further actuation causes clamps to contact the flow cell, the cartridge, or both to exert a hold-down force during processing. Further hold-down forces may be provided by a vacuum chuck. Fluid connections are also made by manifolds that contact the flow cell. The hold-down forces counteract the forces needed for sealing the manifolds to the flow cell.

11 Claims, 16 Drawing Sheets

(56) References Cited

U.S. PATENT DOCUMENTS

| | | | | |
|---|---|---|---|---|
| 6,416,719 B1* | 7/2002 | Fawcett | | B01L 9/523 |
| | | | | 248/346.03 |
| 6,556,923 B2* | 4/2003 | Gallagher | | B01J 19/0046 |
| | | | | 702/23 |
| 7,585,463 B2* | 9/2009 | Austin | | G01N 35/1011 |
| | | | | 422/63 |
| 7,628,064 B1* | 12/2009 | Miller | | G01F 22/00 |
| | | | | 422/63 |
| 8,796,186 B2* | 8/2014 | Shirazi | | G01N 35/0099 |
| | | | | 422/63 |
| 9,068,953 B2* | 6/2015 | Silbert | | G01N 35/0099 |
| 9,429,507 B2 | 8/2016 | Takuya et al. | | |
| 2002/0142483 A1* | 10/2002 | Yao | | B01J 19/0046 |
| | | | | 436/180 |
| 2003/0129755 A1* | 7/2003 | Sadler | | B01L 3/5085 |
| | | | | 506/13 |
| 2004/0197897 A1* | 10/2004 | Leighton | | C12M 45/02 |
| | | | | 435/286.2 |
| 2005/0118060 A1* | 6/2005 | Evans | | G01N 35/028 |
| | | | | 422/63 |
| 2012/0143531 A1 | 6/2012 | Davey et al. | | |
| 2016/0216270 A1 | 7/2016 | Miltenyi et al. | | |

FOREIGN PATENT DOCUMENTS

| | | |
|---|---|---|
| RU | 2442973 | 2/2012 |
| WO | 2012/096703 A1 | 7/2012 |

OTHER PUBLICATIONS

EP Application No. 17202132.1, Extended European Search Report dated Mar. 13, 2018, 7 pages.

* cited by examiner

FLOW CELL ASSEMBLY SECUREMENT SYSTEM AND METHOD

BACKGROUND

Microarrays are used increasingly for a number of purposes, particularly in the processing and detection of analytes of interest, such as in biological applications. In such settings, microarrays are formed on a substrate, and analytes, such as molecules of interest, may be formed or deposited at sites on the substrate. The microarrays may be employed for building, imaging, or analyzing biological material, such as strands of deoxyribonucleic acid (DNA) or ribonucleic acid (RNA), although many other analytes may be loaded and processed. When employed for DNA and RNA analysis, such microarrays may be used to bind, build (e.g., hybridize), and study fragments of these molecules. When the molecules originate from a test subject or patient, the processing may reveal sequences of the nucleic acids making up the fragments, and these may be pieced together to determine all of part of the genome of the subject.

In many applications, microarrays are located in an assembly called a flow cell for processing. The flow cell protects the microarrays and the molecules loaded on them, and allows for introduction of other chemistry into the environment of the microarray, such as for reaction with the loaded molecule. The flow cells also often allow for imaging of the sites at which the molecules are bound, and resulting image data is used for the desired analysis.

As this technology has improved, conventional flow cell designs, and the design of the equipment that allows them to be loaded and properly positioned for processing have evolved. In many instances, important in these designs are not only the reliability of the protection and robustness of the flow cells, but also the high degree of accuracy with which they allow positioning of the flow cells (and microarrays) with respect to processing and imaging components. Tolerances for such components may be demanding, particularly for imaging and, where movement is involved, displacement of the flow cells. Sealed fluid connections are also useful, and these may be made rapidly and accurately. Moreover, to improve throughput, many or all of these operations may be automated or semi-automated, including the securement and positioning of the flow cells, and the completion of the fluid connections.

There is, therefore, a continuing need for improved techniques for accommodating microarrays in processing and imaging equipment, and a particular need for reliable and efficient flow cell designs, and designs of systems that secure the flow cells into processing equipment.

SUMMARY

The present disclosure describes a flow cell securement system and method designed to respond to such needs. In accordance with one aspect of the disclosure, a securement system for a microarray flow cell assembly may comprise a support that in operation receives the flow cell assembly, and securement arms actuatable to draw the flow cell assembly into engagement towards the support in a Z-direction perpendicular to a plane of the flow cell assembly. The system also includes a first driving element actuatable to urge the flow cell assembly into a first reference position in an X-direction perpendicular to the Z-direction, a second driving element actuatable to urge the flow cell assembly into a second reference position in a Y-direction perpendicular to the Z-direction and to the X-direction. An actuating system, in a single securement operation, actuates the securement arms to draw the flow cell assembly towards the support in the Z-direction, actuates the first driving element to urge the flow cell assembly into the first reference position in the X-direction, and actuates the second driving element to urge the flow cell assembly into the second reference position in the Y-direction.

Also disclosed is a securement system for a microarray flow cell assembly that may comprise a support that in operation receives the flow cell assembly, and a securement and locating assembly that, through a single operation, engages the flow cell assembly to urge the flow cell assembly towards the support in a Z-direction perpendicular to a plane of the flow cell assembly, and into a first reference position in an X-direction perpendicular to the Z-direction, and into a second reference position in a Y-direction perpendicular to the Z-direction and to the X-direction.

Also disclosed is a method for securing a flow cell assembly in a processing apparatus that may comprise disposing the flow cell assembly on a support of the processing apparatus, and actuating a securement and locating assembly that, through a single operation, engages the flow cell assembly to urge the flow cell assembly towards the support in a Z-direction perpendicular to a plane of the flow cell assembly, and into a first reference position in an X-direction perpendicular to the Z-direction, and into a second reference position in a Y-direction perpendicular to the Z-direction and to the X-direction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
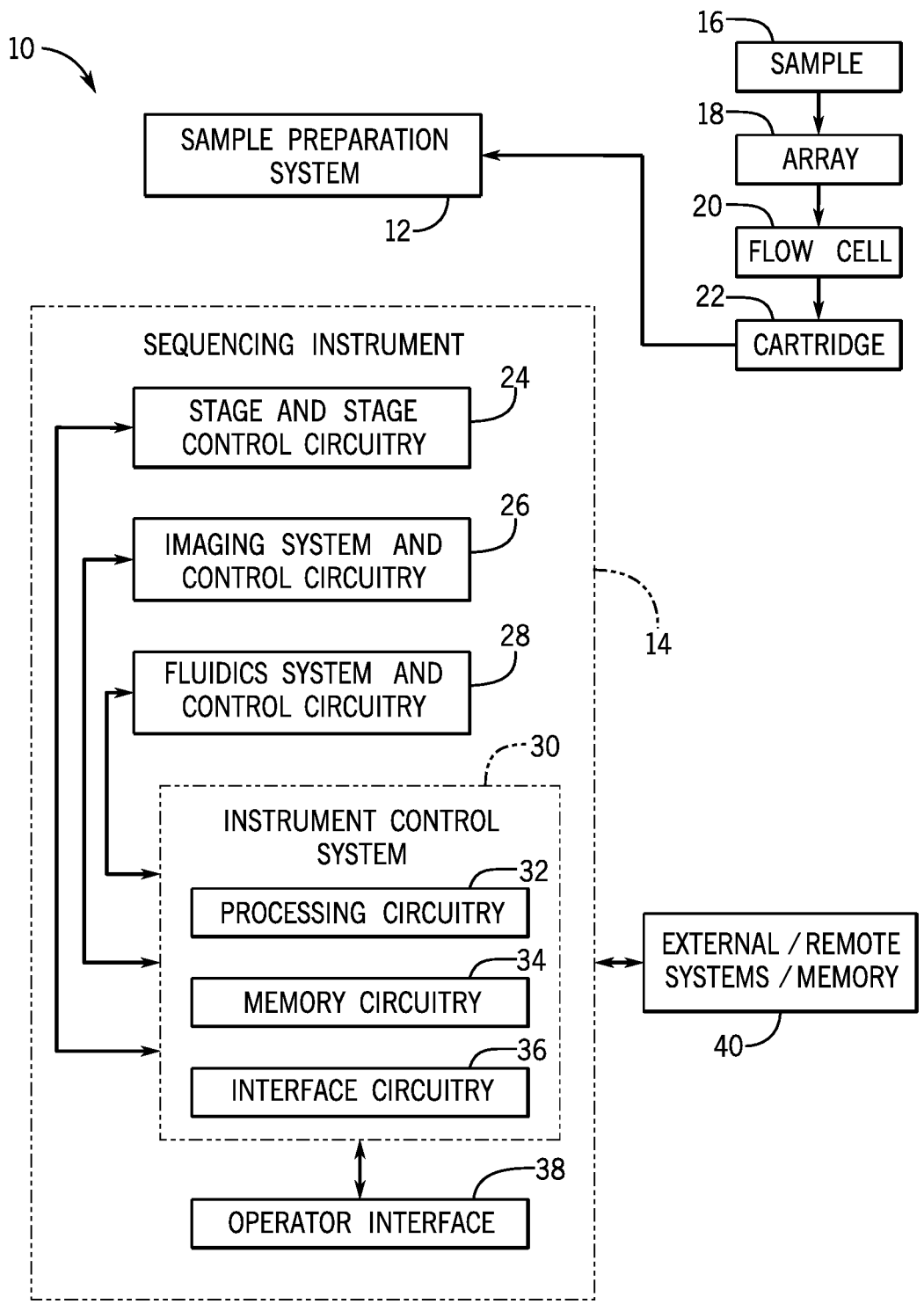
FIG. 1 is a diagrammatical overview of an example microarray processing system, such as for biological samples, employing aspects of the present techniques.

Turning now to the drawings and referring first to FIG. 1, a microarray processing system is illustrated and designated by reference 10. The system may include a sample preparation system 12 which may be separate from other components, such as sequencing equipment. The sample preparation system 12 allows for molecular samples or analytes to be prepared for analysis. As illustrated in the figure, a sample 16 is normally taken from an individual or subject, such as a human, animal, microorganism, plant, or other donor. Of course, the system may be used with samples other than those taken from organisms, including non-organic molecules, synthesized molecules, and so forth. The samples may be prepared in a library that is introduced to the array 18 in a flow cell 20. The array will have sites that are defined at known or determined locations at which molecules of the sample are attached and amplified for analysis. The array is positioned in the flow cell to allow introduction of the sample in a fluid medium, as well as to allow introduction of chemistry used to analyze the sample, such as by attachment of molecules at sites of the array, tagging of the introduced molecules, imaging the tagged molecules, blocking the tags, flushing of the flow cell, and any other processing techniques, which may be carried out cyclically until a number of successive operations of imaging and analysis are completed. The flow cell itself is maintained in a cartridge that can be introduced into the analysis system and held in place as described more fully below.

Once the sample is prepared in the flow cell and its cartridge, it can be placed in the sequencing instrument 14 as indicated diagrammatically in FIG. 1. The instrument may comprise a stage and associated stage control circuitry 24. The stage allows for receiving and securing the cartridge containing the flow cell and array, and may serve to displace the array in multiple axes during processing. For example, in a Z-axis (which may be vertically oriented), the array may be moved toward and away from imaging optics, such as for focusing (and in some cases part of the imaging system may be moved in this Z-direction). In a plane which may be referred to as an XY plane, perpendicular to the Z-axis, the stage may move the flow cell (by movement of the cartridge) to displace the array in two dimensions, allowing imaging all areas of interest on the array (and in some cases the optics may instead or also be moved parallel to this XY plane). The stage may include small motors, sensors and other actuators or feedback devices that allow for the detection of position and movement, and that allow the control circuitry to regulate the position and movement of the array as desired.

The instrument will also include an imaging system and associated control circuitry 26. While many different technologies may be used for imaging, or more generally for detecting the molecules at the array sites, presently contemplated embodiments may make use of confocal optical imaging at wavelengths that cause excitation of fluorescent tags. The tags, excited by virtue of their absorption spectrum, in turn return fluorescent signals by virtue of their emission spectrum. The imaging system is adapted to capture such signals, to process pixelated image data at a resolution that allows for analysis of the signal-emitting sites, and to process and store the resulting image data (or data derived from it).

The instrument further includes a fluidics system and associated control circuitry 28. The fluidics system permits specific fluids, which may include molecules that can be attached to the sites of the array to be introduced into the flow cell at appropriate times during the cyclical processing and analysis. The fluidics system may include valves for this purpose, as well as pumps or any other fluid pressurizing or conveyance components that access the desired fluids during the process, and cause them to be introduced in controlled ways through the flow cell. The fluidics system, or another of parallel system, may also control temperatures in the photocell, both by heating and cooling.

Block 30 in FIG. 1 represents an instrument control system. This collection of elements may be considered as the overall or supervisory or coordinating control system of subsystems of the instrument, that is, the stage, the imaging system, the fluidics system, and any other ancillary systems of the instrument, including for heating and cooling, and for interfacing between the system and other components both locally and remotely. In general, the instrument control system 30 will include processing circuitry 32, which may include one or more general purpose or application-specific of processors or computers. Memory circuitry 34 is used to store programs, settings, control or processing parameters, and any other information desirable for executing loading, processing, imaging, and other tasks of the instrument carried out by the processing circuitry 32. Interface circuitry, designated by reference numeral 36 may include any interface circuitry needed for allowing the processing circuitry 32 to originate and issue commands for actuation of the other control circuitry, and for receiving feedback from sensors, including for securement of the cartridge and flow cell, movement of the array, imaging of the array, movement of fluids through the flow cell, and so forth. Such interface circuitry may also allow for interaction with the system by an operator through an operator interface 38, which in many cases will be integrated in the system for the display of certain settings, sample information, test information, status, errors, and so forth. The interface 38 may also allow for input of commands by an operator.

The interface circuitry 36 may also allow the system to interface with external or remote systems and memory as indicated by reference numeral 40. Such external systems may be local to the instrument, or at remote locations. Moreover, many analysis tasks may be performed after processing of sample, and even at much later times or at different locations. The external memory may also include cloud-based data storage. The stored data and subsequent analysis may allow for reading of image data, processing of image data to identify molecules in the sample, storage and processing of data for sequencing and a compilation of extended lengths of molecules, genomic sequencing, and so forth.

Figure 2:
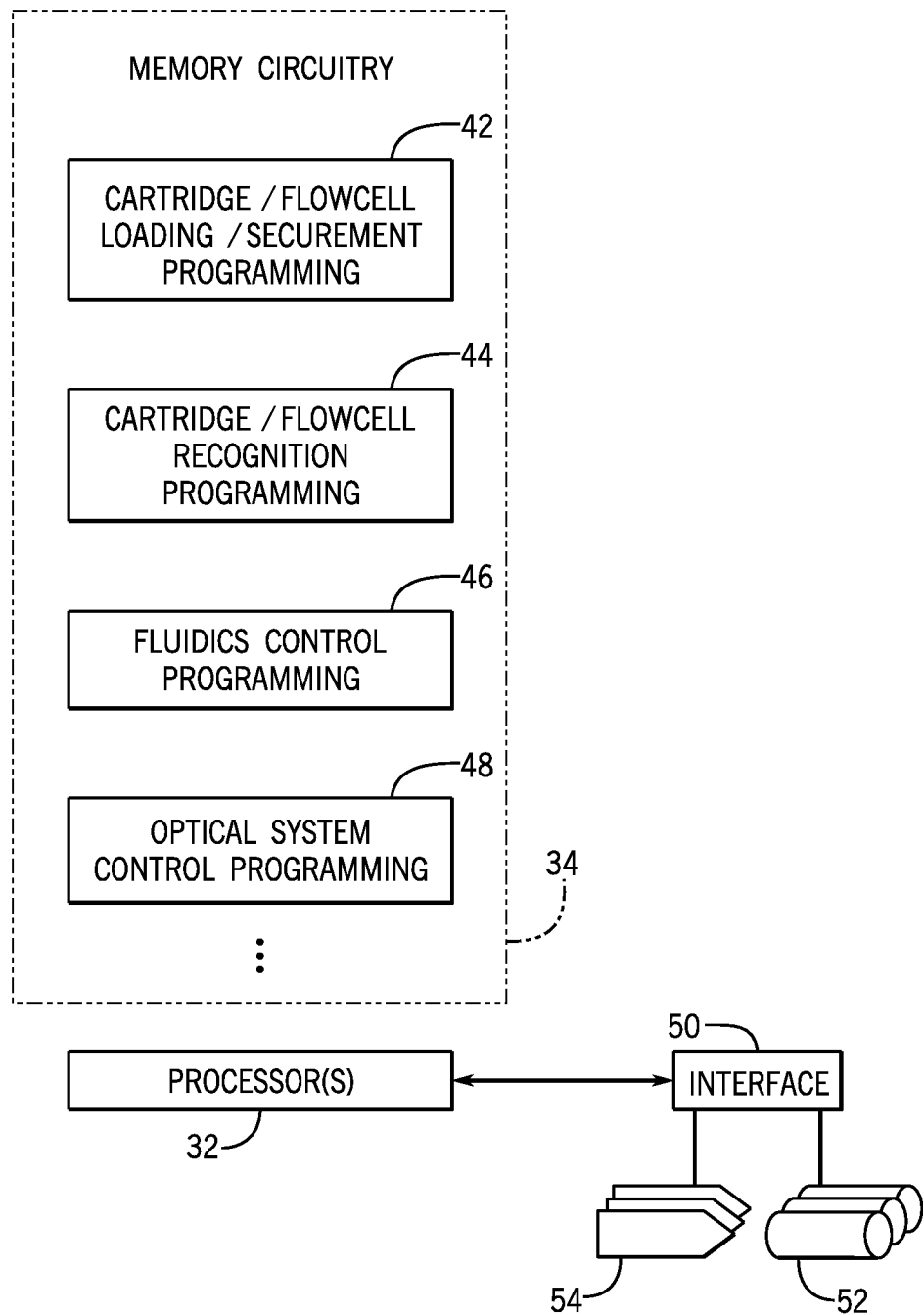
FIG. 2 is a diagrammatical overview of functional components that may be included in a system of the type illustrated in FIG. 1.

FIG. 2 illustrates the memory circuitry 34 and processing and interface components of the instrument of somewhat greater detail. As mentioned above, the memory circuitry 34 will include data, settings, and routines carried out in the instrument during processing of samples. The memory circuitry may include both volatile and non-volatile memory of any desired type, such as, by way of example only, programmable read-only memory, flash memory, random-access memory, both on-board and off-board. The memory circuitry is accessible by the one or more processors 32 for accessing the instrument settings and programming, for carrying out the routines stored in the memory circuitry, and for storing image data and other sensed signals.

In the embodiment illustrated in FIG. 2, certain stored routines or programming is shown. For example, the memory circuitry will store cartridge and flow cell loading and securement programming is indicated by reference numeral 42. Such programming is carried out when a cartridge and flow cell is loaded into the instrument, which in presently contemplated embodiments is performed manually, although certain automated or semi-automated loading may be envisaged. In general, the cartridge and flow cell are after the sample has been prepared in the array, as noted above. The processor may, based upon the programming, instruct components of the instrument to move into loading positions, to translate the cartridge and flow cell into desired X and Y reference positions, to secure the cartridge and flow cell in place, to actuate related components, such as a vacuum, to initiate actuation of fluidics components, such as fluid manifolds mated to the cartridge and flow cell, and so forth. These processing techniques may be carried out in an automated or semi-automated way. Details for such loading and securement are provided below. Together, the vacuum chuck and/or the other surrounding components of the stage may be considered the support for the cartridge and flow cell. Moreover, once the flow cell is loaded in the cartridge, these may, together, be referred to here as the "flow cell assembly".

Reference numeral 44 in FIG. 2 illustrates cartridge and flow cell recognition programming. In certain embodiments, tags, labeling, or any other desired indicia may be provided on the cartridge or flow cell for identifying any useful information that may be detected by the instrument, such as the test or processing to be performed, the subject donor of the example, or any other relevant data. Programming 44 may allow for detecting the data, processing the data, and storing the data in a desired form in conjunction with the imaging and/or molecular characterization carried out by the instrument.

Fluidics control programming 46 allows for sequencing of fluidics elements, such as valves, pumps, pressure and flow sensors, manifold control elements, and so forth. In general, the fluidics control programming will be integrated with elements of the cartridge and flow cell securement programming to allow for initiation of fluidics control signals after the photocell and cartridge are secured in place and sealed connections are made to the fluidics manifolds.

Optics system control programming 48 allows the processing circuitry to move either the optics or the cartridge and flow cell, or both for imaging the sites of the array. In an example sequencing application, for example, once the appropriate molecules have been introduced and attached at the sites, the fluidics control programming may permit flushing of the flow cell, followed by movement of the flow cell to desired positions for imaging by the imaging system. Once imaging is completed in a particular cycle, further instructions can be issued to move the flow cell, to move the optical system, to introduce fluids and constituents for a successive operations of sequencing, and so forth until all desired sequencing has been completed.

As noted above, the processing circuitry, in conjunction with interface circuits not illustrated in FIG. 2, allow the system to control various actuators and sensors. As illustrated diagrammatically in FIG. 2, interface circuitry 50 allows for control signals to be issued and feedback signals to be received for processing. The control signals may be issued, for example, for control of various motors and valves, as indicated by reference numeral 52. Feedback signals from sensors 54, such as position sensors, flow control sensors, temperature sensors, and so forth will also be provided back to the processing circuitry by the interface circuitry.

Figure 3:
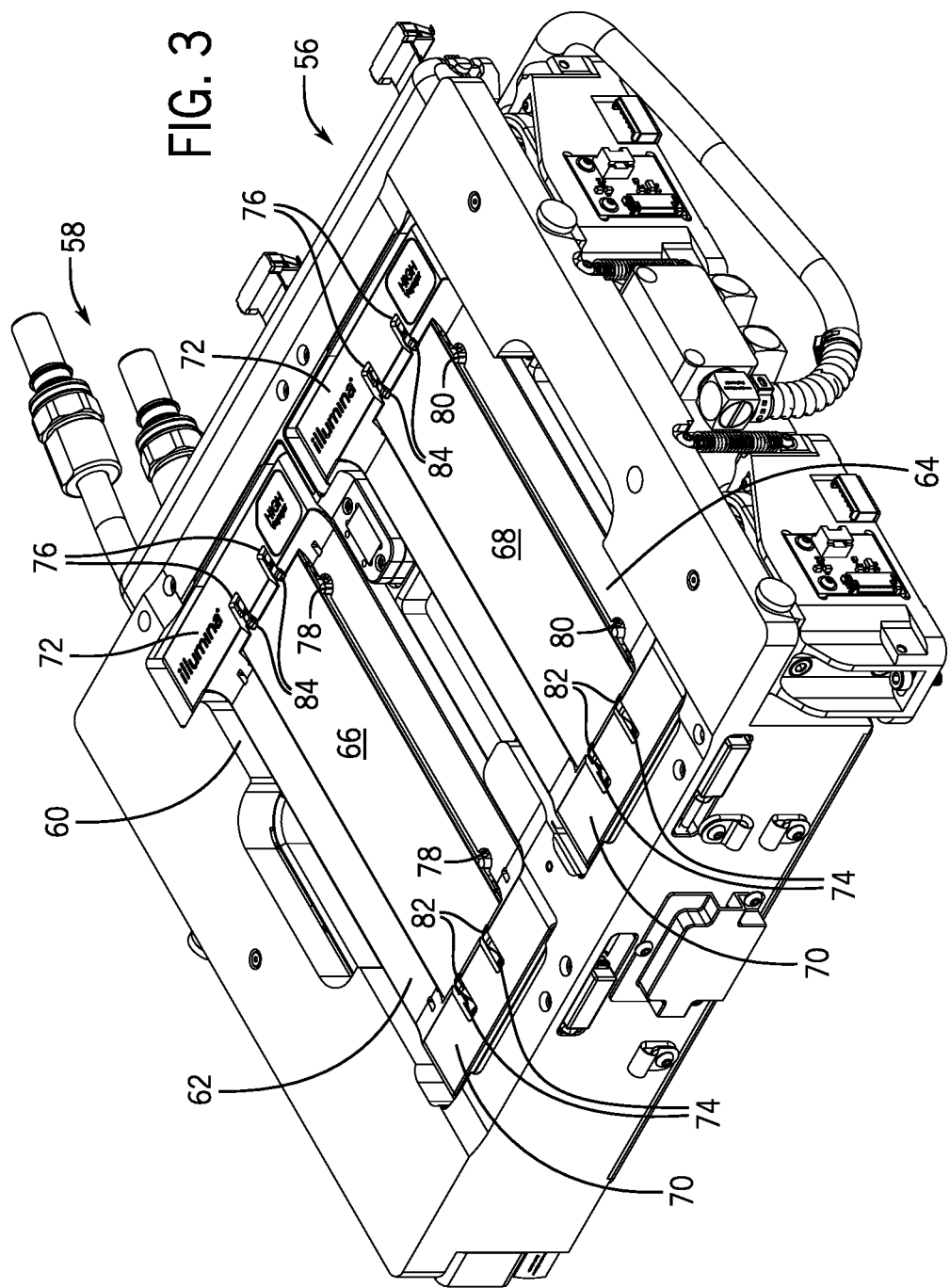
FIG. 3 is a plan view of an example microarray loaded into a flow cell, cartridge, and stage for a processing system of the type contemplated.

FIG. 3 illustrates an example stage subassembly of the processing system in which one or more flow cells holding microarrays can be loaded for analysis. The stage 56 is designed to be assembled in the overall system, and to interface with the control circuitry and optical components discussed above. The stage accommodates fluid lines 58 that provide for the ingress and egress of fluid-based chemistry utilized during the processing and analysis, particularly for sequencing operations. A recess 60 is provided in the stage to receive one or more cartridge and flow cell assemblies. In the embodiment illustrated in FIG. 3, for example, the stage is designed to accommodate two cartridges 62 and 64 that hold respective flow cells 66 and 68. The arrangement may be thought of as oriented in a direction of flow of fluids through the flow cells, with an ingress side 70, sometimes referred to as a "common" side, and an opposite or egress side 72, sometimes referred to as the quote "post" side. As discussed in greater detail below, the cartridges each hold a respective flow cell, and securement assemblies are provided on the common and post sides to hold the cartridge and flow cell in place in the system, and to move the flow cells to reference positions for processing. In the embodiment illustrated in FIG. 3, clamp notches 74 and 76 are provided in opposite sides of each cartridge for this purpose. Moreover, X-direction locator notches 78 and 80 are provided on the side of each cartridge. Clamp arms 82 and 84 will, after the cartridges are loaded in the stage, move to clamped positions extending through the clamp notches to hold the cartridges and flow cells in position, as described below. It may be noted that in the illustrated embodiment, the notches 78 and 80 are sized so that pins that will protrude into them to locate the cartridge and flow cell somewhat loosely, while allowing for X-direction movement when the assemblies are actuated to shift the cartridge and flow cell to the desired X-direction reference position.

It may be noted that reference is made in the present disclosure to directions of a coordinate system in terms of X-, Y-, and Z-directions or axes. In this Cartesian coordinate system, the X- and Y-directions are those aligned with the length and width of the flow cell, and are orthogonal (perpendicular) to one another. Together, they define an X-Y plane corresponding to the plane of the flow cell, or a plane parallel to the plane of the flow cell. The Z-direction is orthogonal (perpendicular) to that X- and Y-directions. In many embodiments, imaging optics may be moveable in the X- and Y-directions to allow for imaging of different parts of the flow cell (or the flow cell may be moveable along the X-and Y-directions, or both the imagine components and the flow cell may be movable along the X- and Y-directions), and the imaging optics or the flow cell, or both, may be movable in the Z-direction to permit focusing of the imaging system on the sites of the flow cell.

Figure 4:
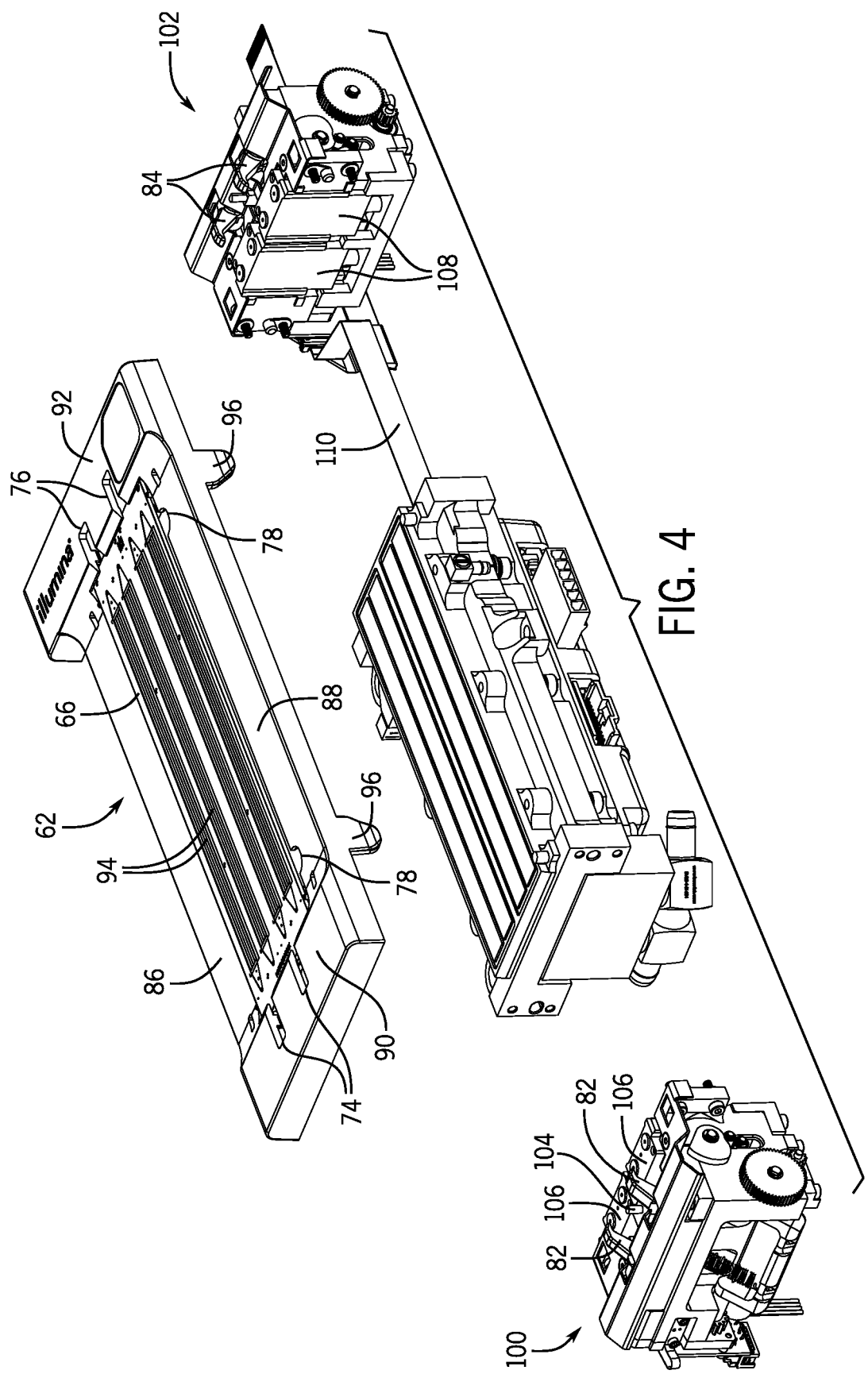
FIG. 4 is an exploded view of an example flow cell, and assemblies for securing the flow cell in the system and for moving it to desired reference positions.

FIG. 4 illustrates components of the stage removed from the overall assembly and exploded for explanatory purposes. As noted above, a cartridge 62 holds a respective flow cell 66. Once mounted in the cartridge, the cartridge and flow cell act as an assembly that can be manipulated without the need directly to handle the flow cell. The cartridge illustrated has a frame-like structure comprising lateral sides 86 and 88, and ends 90 and 92. The clamp notches 74 and 76 are formed in the ends as shown. The X-locator notches 78 are, in this embodiment, formed in the lateral side 88, and will receive pins for loosely locating the photocell before its movement into a desired reference position in the X-direction. Also visible in the figure are flow paths 94 formed in the flow cell that allow for the flow of fluid chemistry over the microarray during processing. Tabs or legs 96 may extend from the cartridge to allow for manipulation in the system, and to aid in locating the cartridge in the support.

In a location below the cartridge and flow cell is a vacuum chuck 98. The vacuum chuck allows for providing a negative pressure that, when the flow cell is mounted in the system, will draw the flow cell into closer engagement with the surface of the vacuum chuck. The resulting force aids in holding the flow cell in place, and in maintaining a flatter or more planar surface for processing and imaging.

A common-side securement assembly 100 is provided on the ingress side of the cartridge and flow cell, while a post-side securement assembly 102 is provided on the opposite end. Visible in FIG. 4 also is a Y-direction locator pin 104 provided on the common-side assembly. This pin, or any other suitable Y-direction locator feature may be provided elsewhere in the assembly, or on the opposite or another side. This pin facilitates movement of the cartridge and flow cell to a Y reference position as discussed below. Moreover, manifolds 106 and 108 are provided in the securement assemblies, respectively, for engaging the cartridge and flow cell to provide sealed fluid connections for the fluid chemistry. Finally, as shown in FIG. 4, one or more power and communications connections 110 may be provided between these subassemblies (and to circuits not shown in the figure) to allow for powering of actuator in desired sequences for securement and registering of the cartridge and flow cell, and for providing feedback from sensors associated with the subassemblies.

Figure 5:
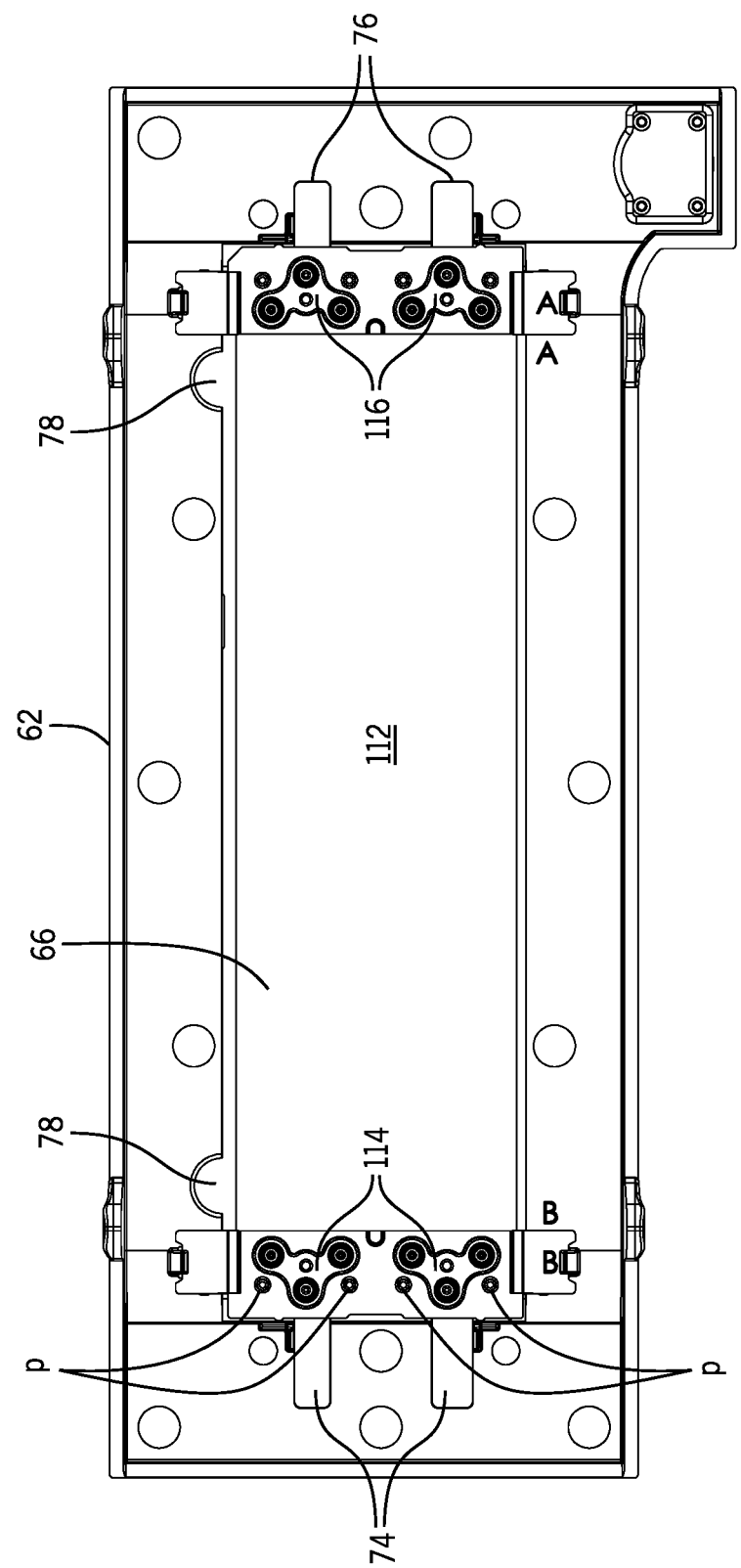
FIG. 5 is a plan view of the underside of the example cartridge and flow cell.

FIG. 5 shows a bottom side of the example cartridge and flow cell loaded in it for processing. The flow cell 66 is placed within the frame formed by the cartridge 62. The X-direction locator notches 78 can be seen adjacent to the flow cell. Moreover, the clamp notches 74 and 76 are visible on each end of the flow cell. The flow cell bottom surface 112 will face the vacuum chuck mentioned above when the cartridge and flow cell are loaded into the system, and forces on this surface will be drawn the flow cell downwardly, improving engagement and planarity of the flow cell. Gaskets 114 and 116 are disposed in the flow cell to receive the upper sides of the manifolds discussed above, which are moved into engagement with the flow cell by the securement assemblies. In the illustrated embodiment, the gaskets are made of an elastomeric material that can be molded and inserted into recesses formed in the ends of the flow cell. Advantageously, these gaskets may provide for multiple fluid flow paths, and may be identical to one another, reducing the overall number of parts in the system.

Figure 6:
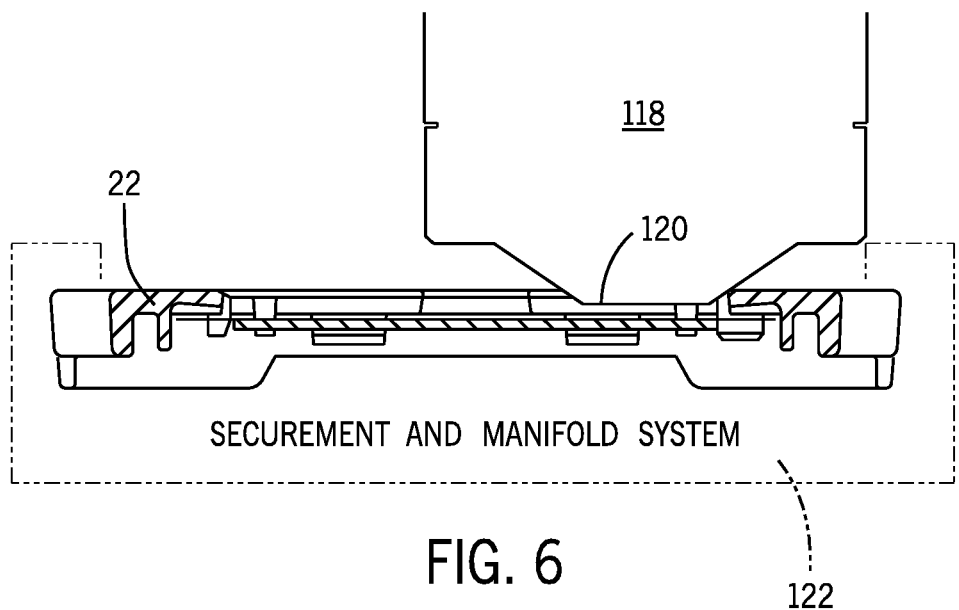
FIG. 6 is a partial sectional elevation of the example cartridge and flow cell loaded into the system beneath the system optics.

FIG. 6 illustrates, in one example, the general relationship between the cartridge and flow cell and the system optics during processing. The cartridge 22 will be located in the system, and the optics 118 can be lowered into place with the lower face 120 of the optics extending within close proximity of the upper surface of the flow cell. In some implementations, the optics may be stationary at least on the Z-direction (which in the illustrated embodiment is a vertical axis, although in other embodiments the coordinate X-Y-Z coordinate system may be rotated or tilted), and the cartridge and flow cell moved as needed for imaging. Similarly, the optics, and/or the stage can be moved in X- and Y-directions to scan the microarray for imaging. The overall securement and manifold system is designated in FIG. 6 by reference numeral 122. In general, this system may be considered to include the stage, the control structures for the stage, the securement assemblies, the vacuum chuck, manifolds and fluidics components, and so forth. It may also be noted that the system may include additional components and systems, such as for controlling the temperature of the flow cell, sensing temperatures, as well as fluidic components, such as valves, conduits, pumps, and so forth.

Turning to the structures of the securement assemblies, advantageously, many of the components on the common and post sides are identical, further reducing the number of different parts in the overall system. Both securement assemblies are designed to move to a loading or open position to accept a cartridge and flow cell, and may be actuated to carry a programmed and automated sequence of actions to move the cartridge and flow cell to X- and Y-reference positions, and to clamp the flow cell securely place for processing. Moreover, the sequence of operations carried out by the assemblies also allows for automatic sealed connections for fluids used during processing.

Figure 7:
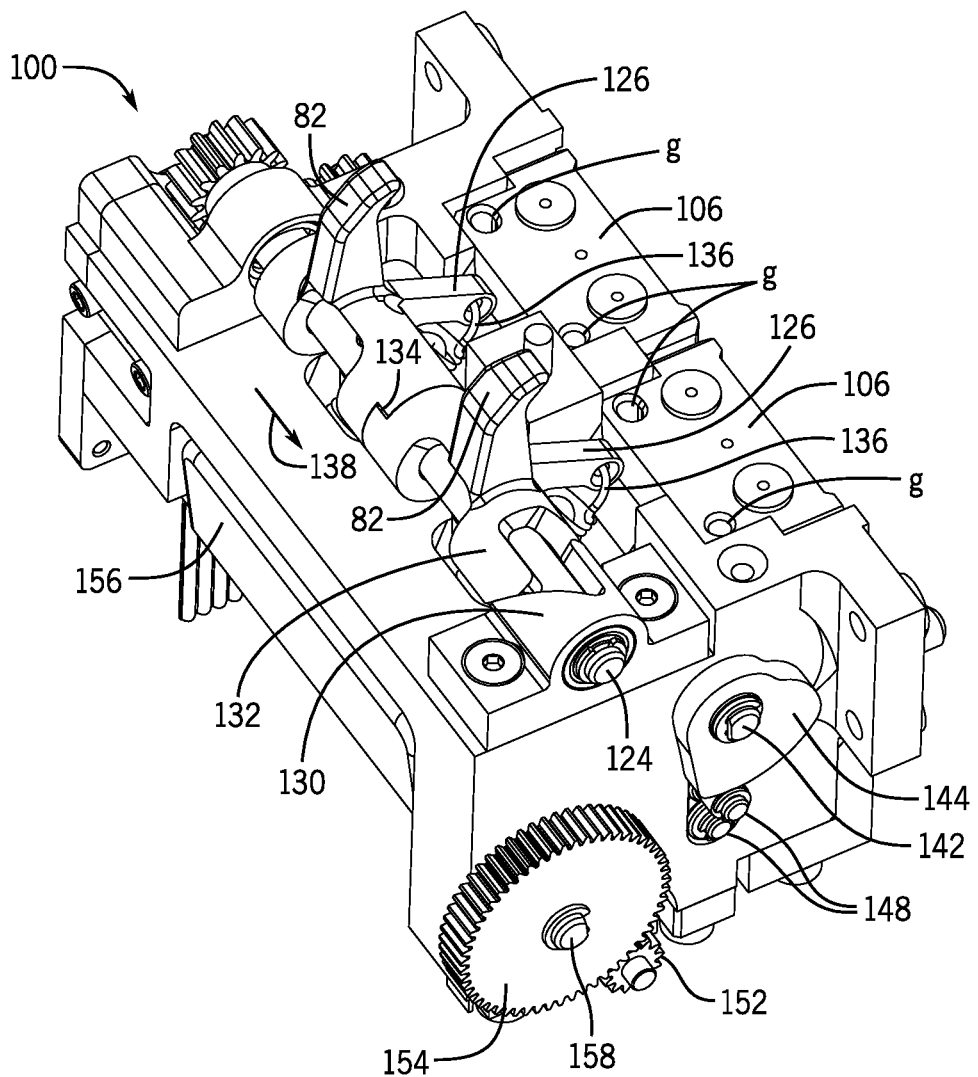
FIGS. 7-10 are perspective views of an example securement assembly for the "common" or input side of the flow cell showing certain structural elements in the "clamp arms raised" position.
Figure 8:
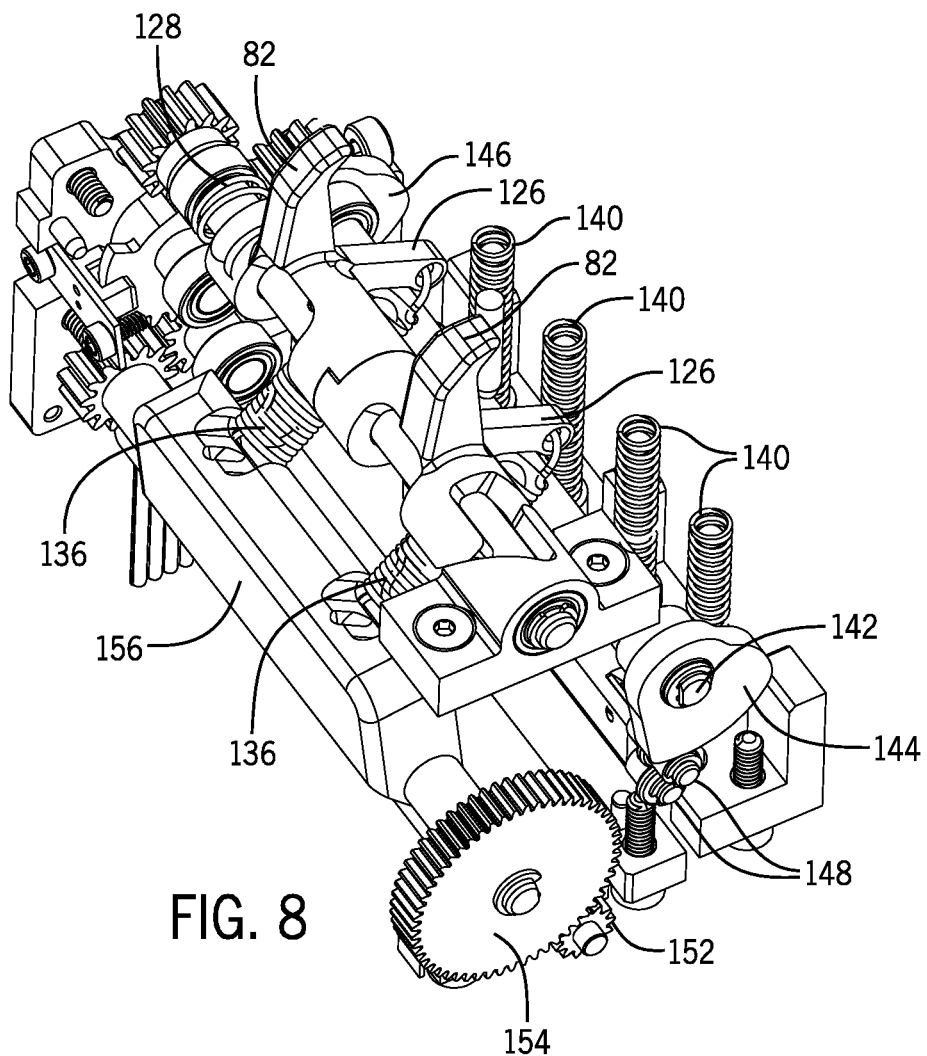

FIGS. 7, 8, 9, and 10 illustrated example components and structures of the common-side securement assembly 100, although many of these may be the same on the post side, as discussed below. In the illustrated embodiment, the assembly comprises a framework, housing, or body that may be made of one or more structural elements that hold the movable components that perform the locating and engagement operations. In the illustrations, certain covers, housings, and so forth have been removed for explanatory purposes. As can be seen in FIGS. 7 and 8, for example, the assembly comprises a clamp shaft 124 that extends transversely and that supports the clamp arms 82. These clamp arms are integral with hubs on this shaft so that they can move laterally along the shaft in sliding engagement. Moreover, a lever arm 126 is integral with the clamp arms to urge the clap arms into engagement with the flow cell as discussed below. A spring 128 (see FIG. 8) is provided at one end of the clamp shaft 124 to urge the clamp arms slidingly to one side (the lower right in FIGS. 7 and 8). The spring forces engagement between a stationary helical cam 130 on opposite side and a mating helical cam follower 132 (on the right-hand clamp arm in the view of FIG. 7). A pair of engagement surfaces 134 is provided between the clamp arms to allow some freedom of rotation, while urging rotation of the two clamp arms together during engagement. Springs 136 are secured to the lever arms 126 and may be extended to exert forces on these levers to pull the clamp arms into engagement as discussed below.

From the open position shown in FIGS. 7 and 8, the clamp arms 82 may be rotated about the clamp shaft 24 and slid along the clamp shaft as indicated by arrow 138 in FIG. 7 as the assembly is actuated. That is, as the levers 126 are brought downwardly and the clamp shaft is rotated two lower the arms, engagement of the helical cam follower 132 on the helical cam 130 will allow the force of spring 128 two slide the arms downwardly and laterally. This movement will in turn urge the cartridge and flow cell towards the reference position in the X-direction. Additional details on this actuation are provided below.

Figure 12:
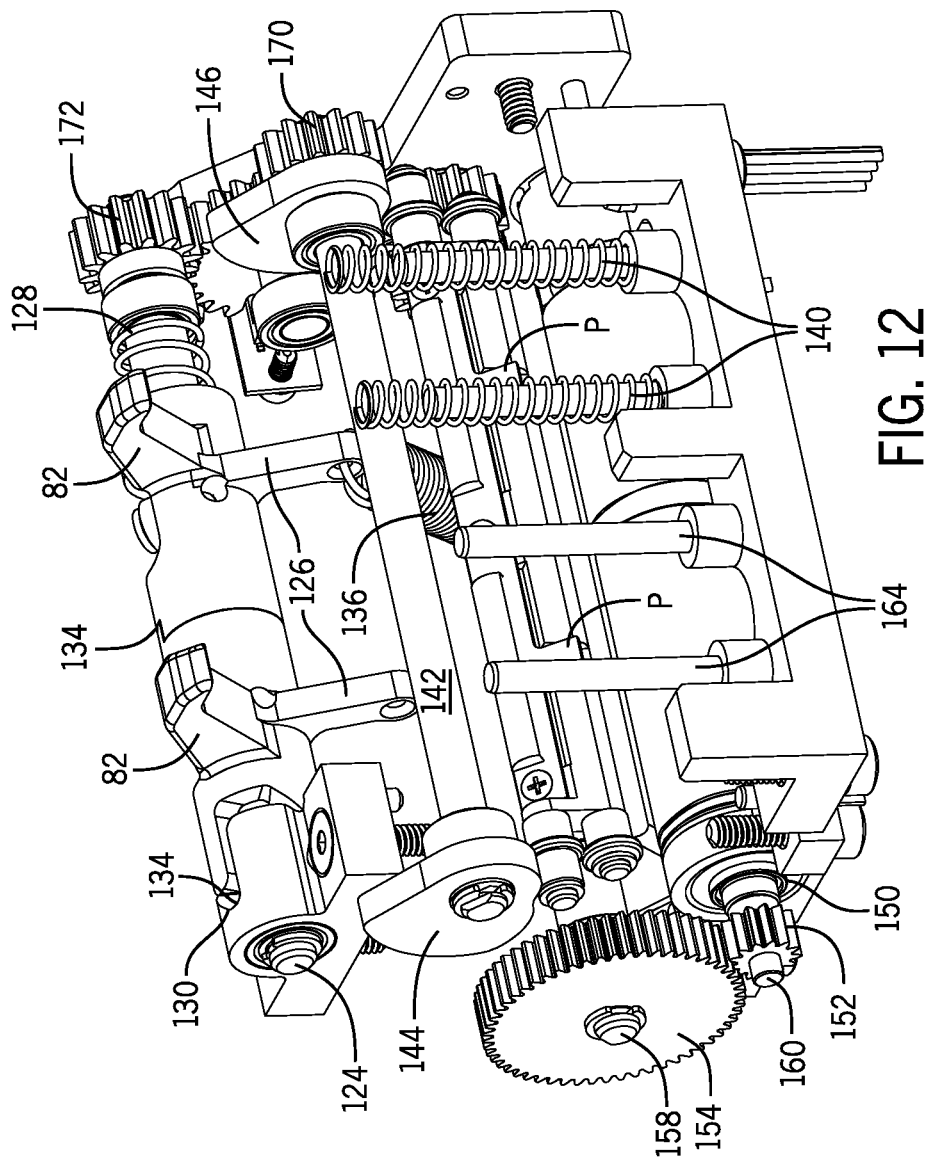
Figure 13:
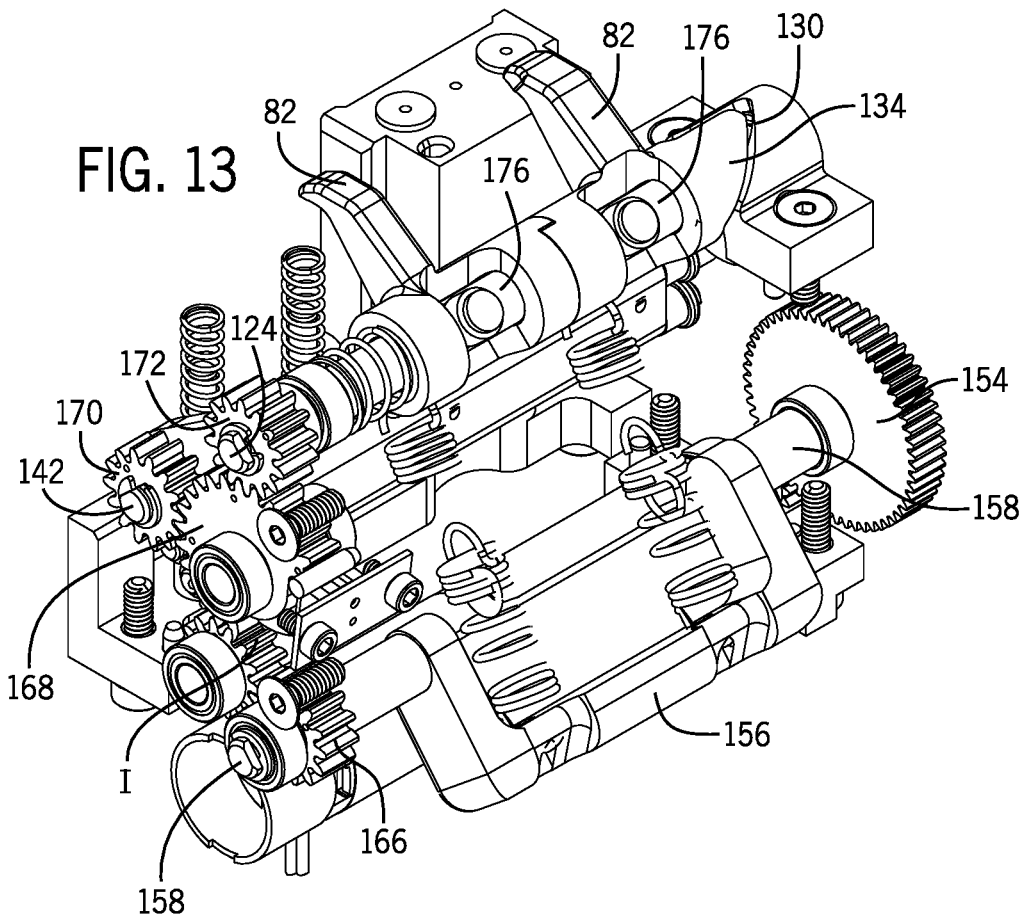
Figure 14:
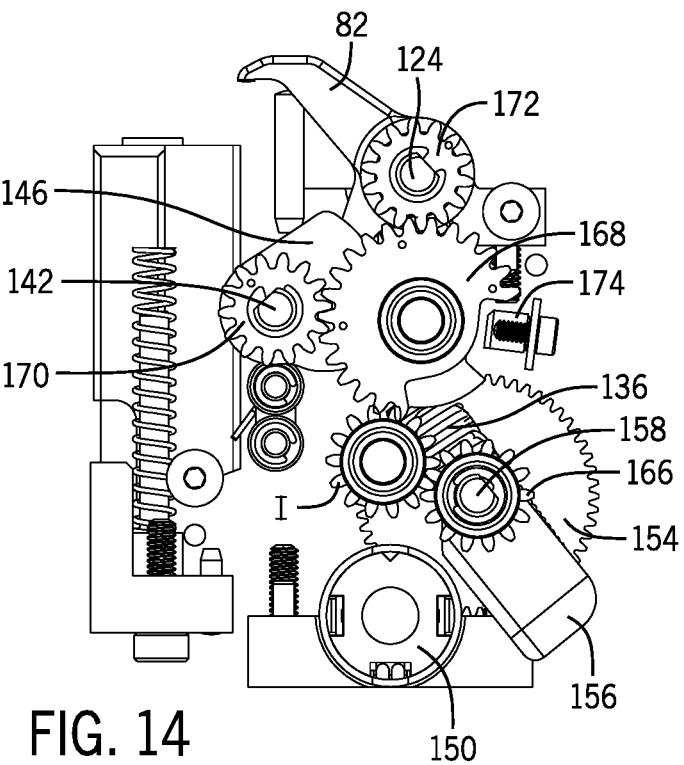
FIGS. 14 and 15 are side views of the assembly.
Figure 15:
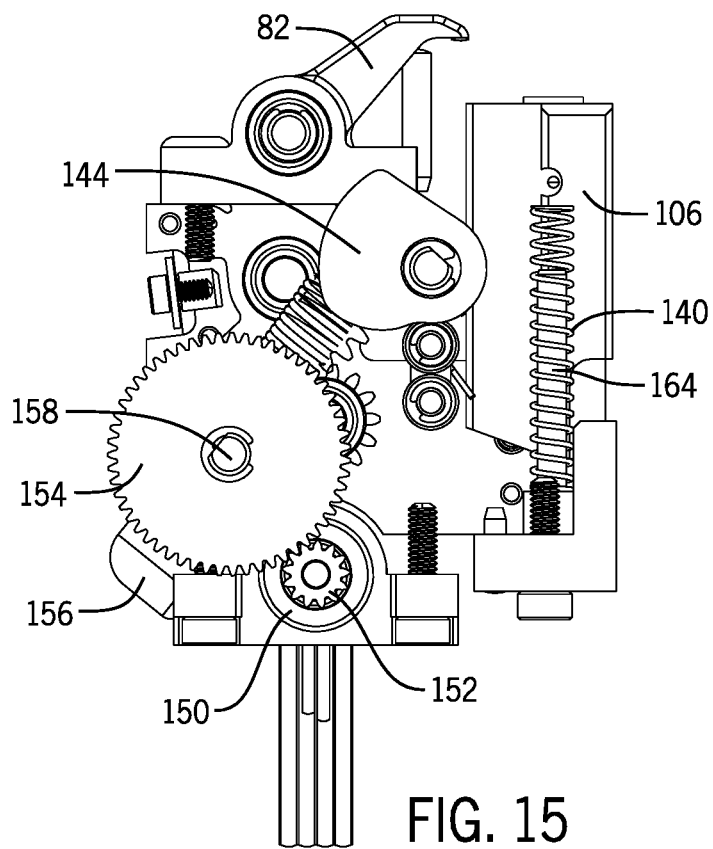

Also visible in the figures are springs 140 that fit within the manifolds 106. These springs urge the manifolds upwardly into engagement with the flow cell. A notch and pawl arrangement is provided internally that catches the manifolds to pull them downwardly in opposition to the forces of the springs 140 when the cartridge and flow cell are disengaged in the open position of the securement assemblies. The pawl is visible in FIGS. 9 and 12, and is labeled "P".

Figure 9:
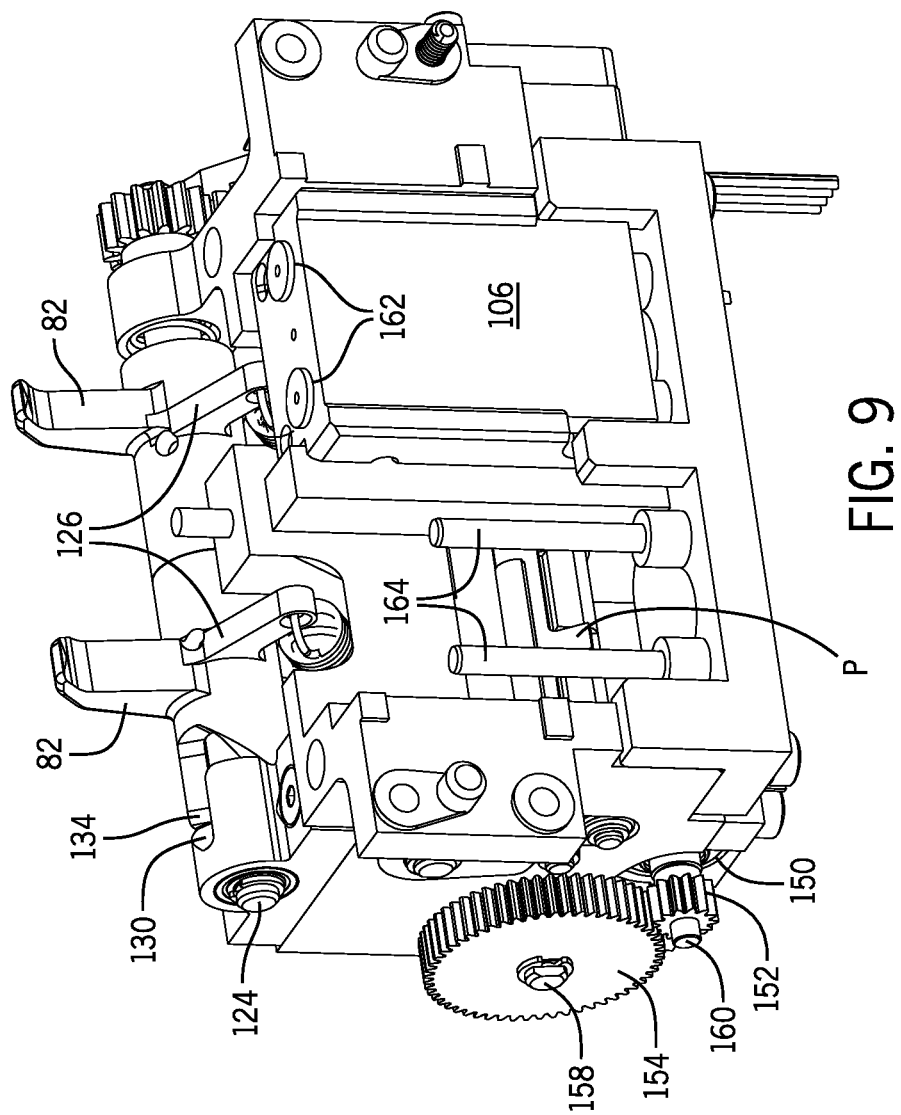
Figure 10:
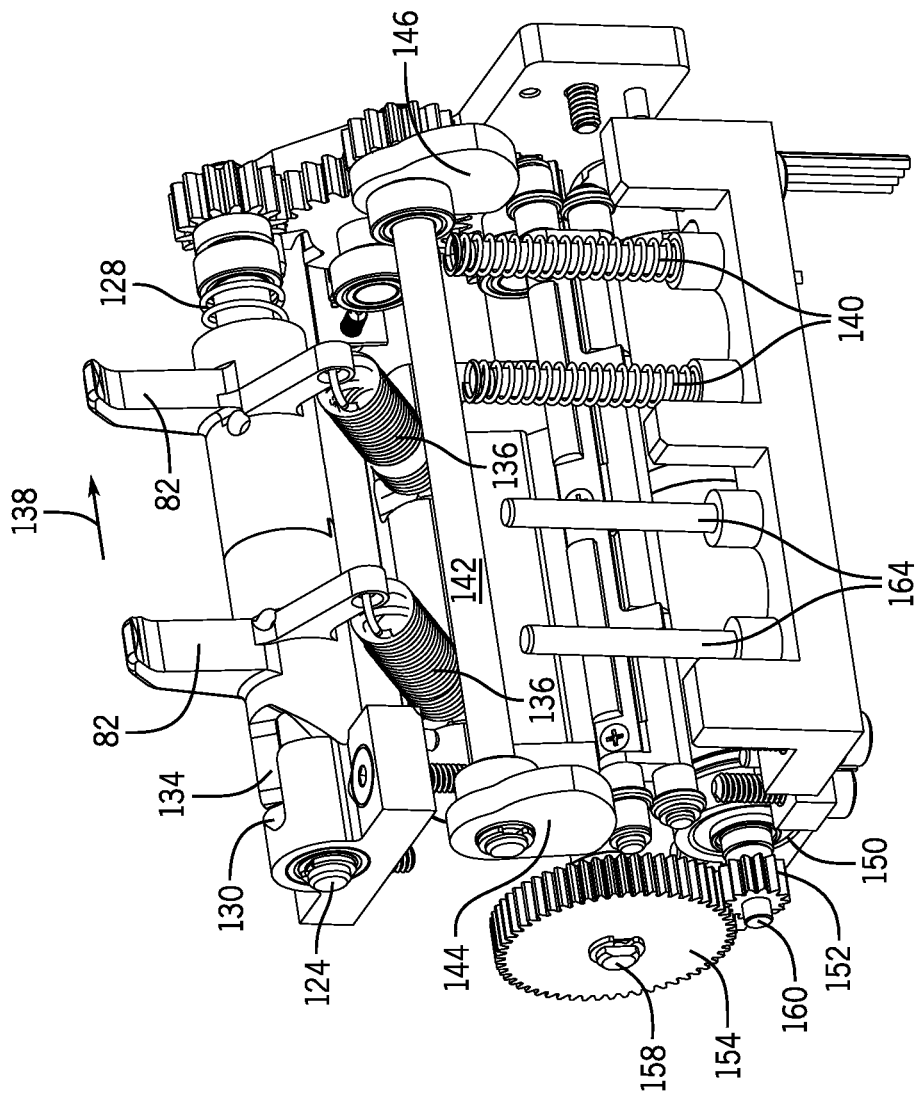

Referring to FIGS. 7, 8, and to the additional views of FIGS. 9 and 10, the actuating structures further include a cam shaft 142 on which a pair of cams 144 and 146 are mounted to rotate with the shaft. Cam followers 148 are moved by rotation of the cams as the camshaft is rotated during operation. A single electric motor 150 provides rotary output for driving all of the movements of the components of the assembly, including the camshaft 142 and cams 144 and 146. The motor output shaft carries a drive gear 152 that meshes with and drives and output gear 154. This output gear, in turn, causes rotation of a spring crank 156, which is mounted to its shaft 158. As discussed below, the spring crank 156 is coupled to the springs 136 that, as noted above, are connected at an opposite end to the lever arms 126.

In the current implementation shown, the assembly is designed to move between three positions, the first being the open position illustrated in FIGS. 7, 8, 9 and 10. This position allows for loading of the cartridge and flow cell. As noted above, when loaded, the clamp arms will extend upwardly through the corresponding notches in the cartridge. The mechanisms for the clamping and X-direction movement are essentially the same on both the common and post sides, such that each comprises a similar main motor, gear trains and moving components. After loading of the cartridge and flow cell, then, the main motors on both ends will be energized to move the corresponding clamp arms to a "hover" position where they remain over the cartridge and flow cell, but not in contact with the upper side of either. The flow cell is then properly located, and the mechanism is moved further to its third position, wherein the cartridge and flow cell are clamped by further downward movement of the clamp arms, and fluid connections are made by allowing upward, biased movement of the manifolds.

Figure 11:
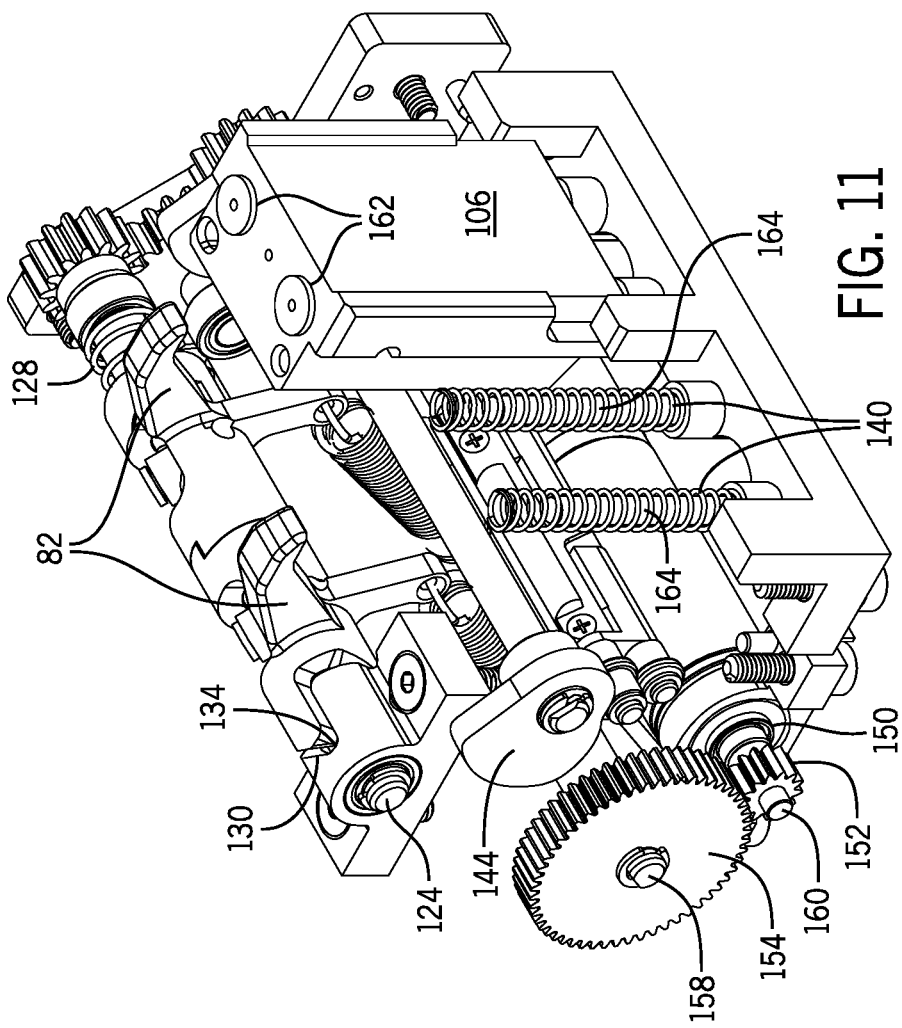
FIGS. 11-13 are perspective views of the assembly with the clamp arms lowered.

FIGS. 11 through 15 show the mechanism described above for the common-side securement assembly with the clamp arms and other components moved toward their hover, and clamped positions. As noted in FIG. 11, for example, the motor 150 has an output shaft 160 on which the gear 152 is carried. Again, this gear interfaces with output gear 154, which is mounted on the output shaft 158. It may be noted that visible in FIG. 11 are gasket interfaces 162 on an upper side of the manifolds, which contact the gaskets described above for sealed fluid connections between the manifold in the flow cell when the flow cell is fully secured and engaged in the system. Moreover, posts 164 may be seen on which the biasing springs 140 for the manifolds are mounted. These posts allow for carrying the manifolds and for maintaining alignment of the manifolds in the assembly.

Several points may be noted about the manifolds as they are employed in the illustrated embodiment. First, as noted, they are mounted to be biased into their engaged positions and are pulled downwardly from their engaged positions by pawls P that are moved by movement of the securement assembly mechanisms. The manifolds are loosely guided and "float" by virtue of their being mounted on the posts that are inserted into somewhat oversized elongated openings in each manifold. Moreover, the housing structures surrounding the manifolds are similarly oversized so at not to fit too closely around the manifold, allowing it to move freely and to self-align when engaging the gaskets of the flow cell. Also, the manifolds may be easily removed from the structure for cleaning or replacement. For this a thin tool may be inserted between the housing and the back of the manifold to depress the pawl (see, e.g., FIGS. 9 and 12), which removes the pawl from the corresponding notch, allowing the manifold to be raised from its post (after which fluid lines may be easily removed from the manifold if it is to be fully removed and/or replaced).

Moreover, in the illustrated embodiment, each manifold is further aligned by engagement with the flow cell as it is engaged into its sealed position. For this, small pins "p" are provided on the cartridge (see FIG. 5) that engage guide openings "g" at the top of each manifold (see FIG. 7). This aids in aligning the manifolds properly with the gaskets.

FIGS. 12, 13, 14, and 15 illustrate the gear trains that provide for motion of the primary components of the assembly. In the illustrated embodiment, the gear train comprises a crank output gear 166 that is mounted on the same shaft 158 as the output gear 154, but on an opposite side. Rotation of the output gear 154 then causes rotation of the crank output gear 166, driven by the motor mentioned above. The crank output gear 166 drives an idler gear I, that in turn meshes with and drives a "home sensor" or "flag" gear 168. This gear further meshes with and drives a cam gear 170 that is mounted and rotates with the cam shaft 142. Finally, the home sensor gear 168 also meshes with and drives a clamp arm gear 172 mounted on and rotating with the clamp shaft 124.

By actuating the motor, then, this gear train is caused to move to perform a number of movements. These include lateral sliding movement of the clamp arms along the shaft, under the influence of the spring 128 and the helical cam 130 and follower 132 to move the flow cell to the X-direction reference position; movement of the clamp arms to the "hover" position (and later to the clamped position in contact with the flow cell, the cartridge or both) by rotation of the clamp shaft 124; and movement of the spring crank 156 on the shaft 158 (with extension of the springs 136 to exert a force on the lever arms 126. It may be noted that the same actions are carried out on both sides of the cartridge and flow cell.

It may also be noted that the assemblies comprise a sensor for position feedback of the moving elements. In the illustrated embodiment, this includes a "home position" sensor 174 (such as an optical sensor) that detects the position or orientation of the "home sensor" or "flag" gear 168 (e.g., by detecting an edge formed in this gear). This feedback allows the control circuitry to confirm that the mechanism is in the initial or "home" position from which the movements to the "hover" and "clamped" positions are carried out.

It may be further noted that in the illustrated embodiment, the clamp shaft 142 carries followers 176 (see FIG. 13) that are rotated with the clamp shaft 142. These followers reside within notches formed in the hubs of the clamp arms to aid in movement of the arms back to their open position.

Moreover, as noted above, in the illustrated embodiment the manifolds are biased by springs 140 towards an upwards or sealing engaged position. In an inner side of the manifolds a notch is formed that engages a pawl that is, in turn, moved upwardly and downwardly by one of the cam followers described above. The manifolds are thereby allowed to move upwardly at the appropriate time in the engagement process, and are moved downwardly, out of engagement, by the opposite motion of the mechanism.

Figure 16:
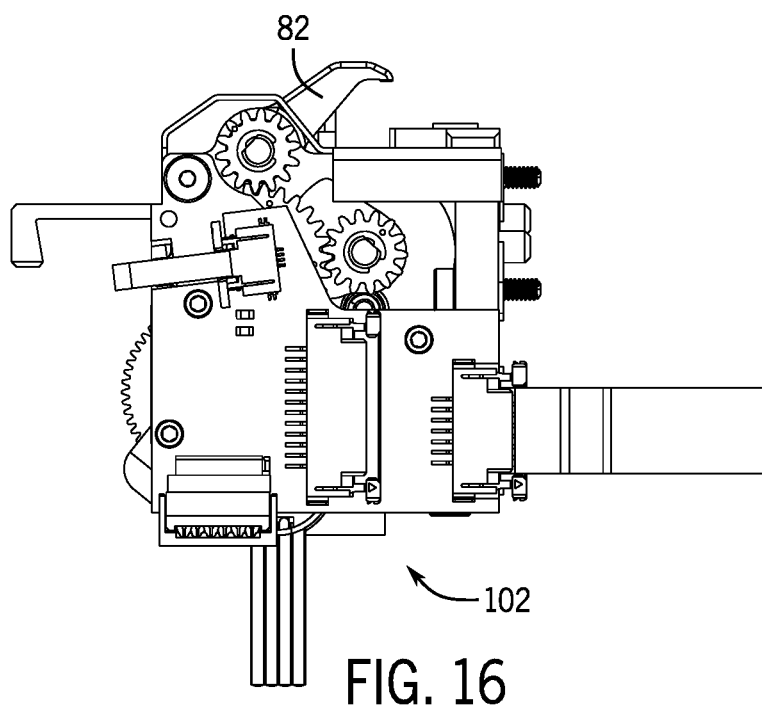
FIGS. 16-18 are side views of an example securement assembly for the opposite side of the flow cell.
Figure 17:
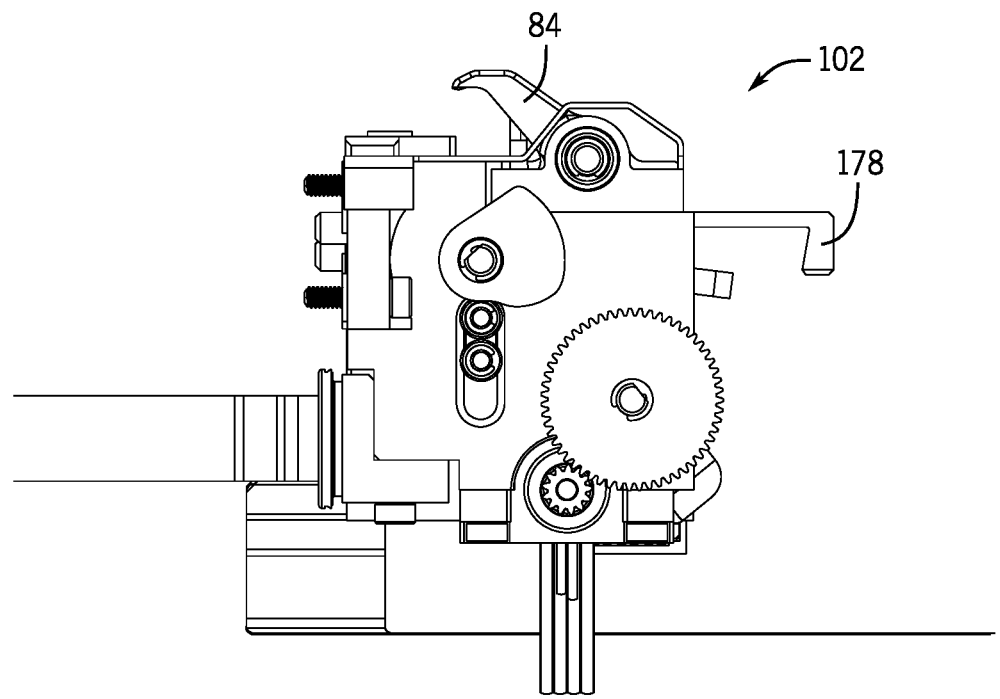
Figure 18:
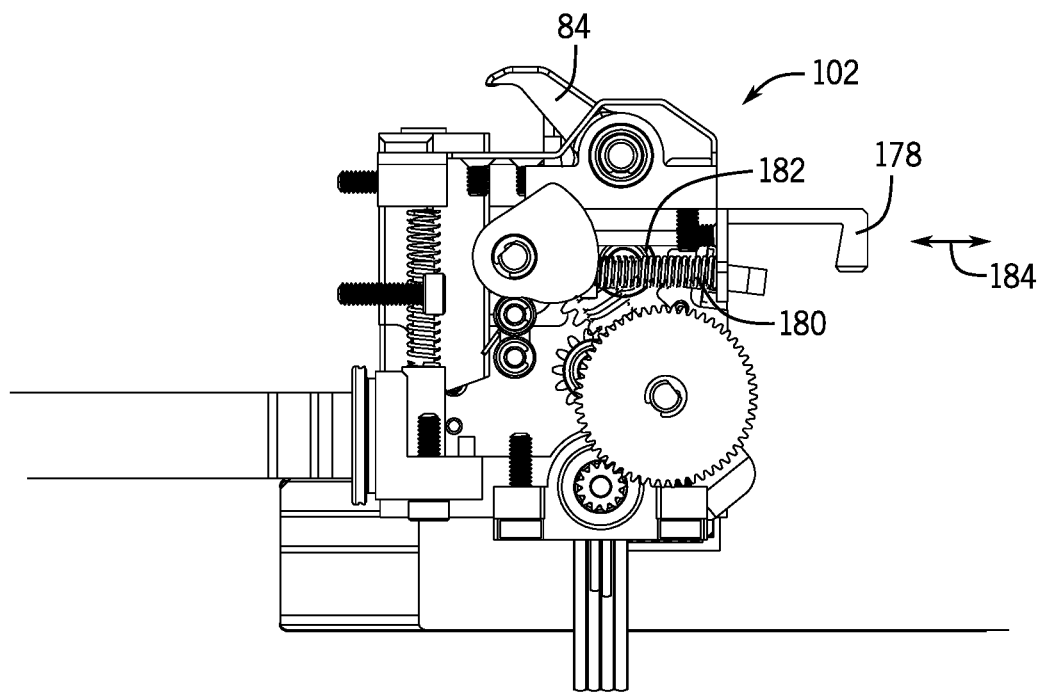

As noted, the mechanism of the post-side securement assembly 102 is identical to that of the common-side securement assembly 100, but in the illustrated embodiment, the post-side assembly also provides for urging the cartridge and flow cell to a Y-direction reference position. The assembly 102, shown in greater detail in FIGS. 16, 17, and 18, thus includes a Y-direction pusher 178 that is biased by towards a retracted position by an internal spring 180 (see, e.g., FIG. 18). A second motor 182 in the assembly is actuated to urge the pusher 178 towards the left in the views of FIGS. 17 and 18, against the force of the spring, to move the Y-direction locating pin (104, see FIG. 4) to contact the cartridge and to move it to a reference position in the Y-direction. The motor thus allows for movement of the pusher and pin in the Y-direction, as indicated by reference numeral 184 in FIG. 18.

The movements of the assemblies and their constituent parts follow a pre-established routine that allows for all of the multiple movements and engagements for properly locating and securing the cartridge and flow cell as outlined above. These are commanded by the control circuitry described, and based upon initiation of the process, which may be manually initiated, or that may be partially or fully automated, and based upon feedback, such as from the "home position" sensor mentioned. In the presently contemplated implementation, the engagement and locating operations are fully automated once the engagement and securement process has been initiated.

Figure 19:
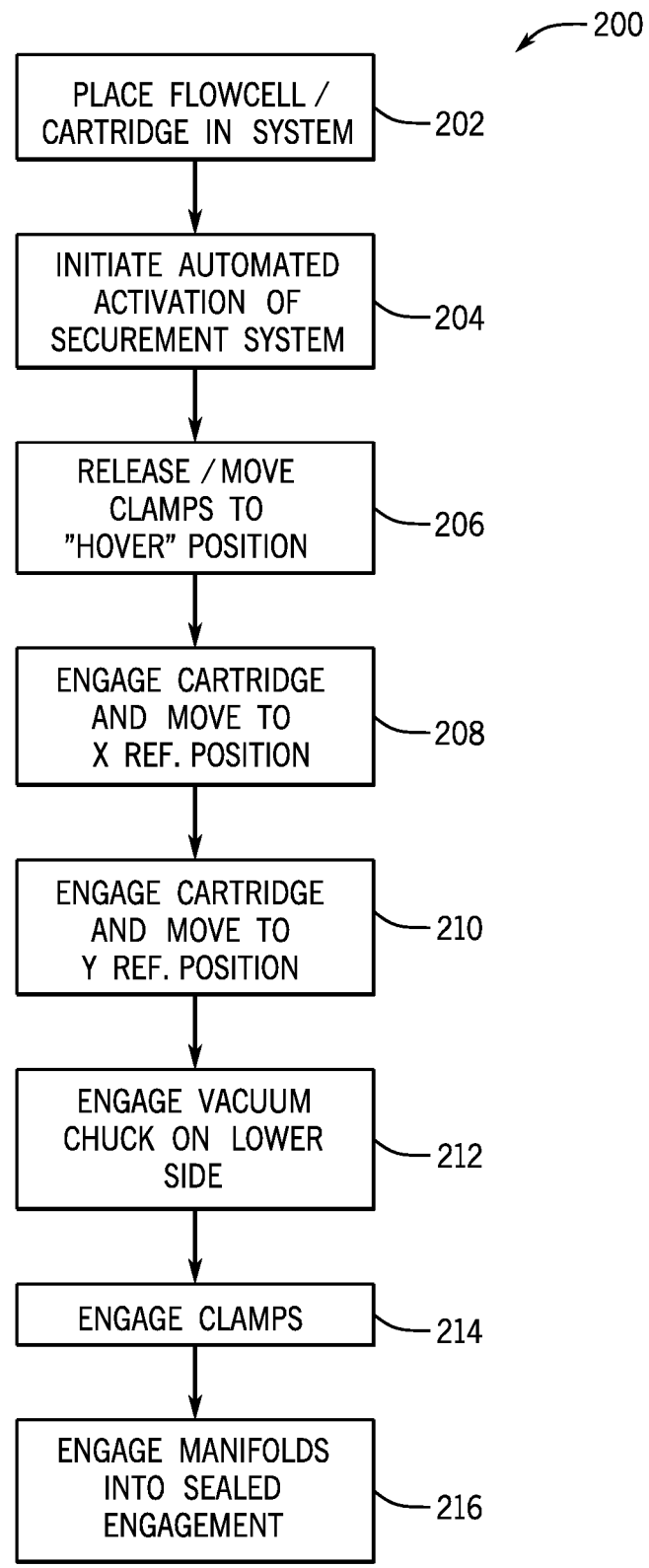
FIG. 19 is a flow chart illustrating example operations in securement of the flow cell in the assemblies and movement to reference positions.

FIG. 19 illustrates example control logic 200 for carrying out the engagement and securement of the cartridge and flow cell with the assemblies described above. The cartridge and flow cell, assembled as described, are first mounted in the system is indicated by reference 202. The securement system is then activated to initiate the automated process, at 204. The main motors on both sides of the device are then actuated to move the gear train and thereby to move the clamp arms to their "hover" position, as indicated at 206. This also causes movement of the spring crank with extension of the corresponding biasing springs, as well as sliding movement of the clamp arms along their support shaft. At 208, then, the cartridge is engaged and moved to its reference position in the X-direction. In the illustrated embodiment, these last two operations are performed simultaneously by virtue of the mechanical arrangement of the clamp arms and helical cam. At 210, then, the second motor on the post-side assembly is actuated to cause the Y-direction pin to engage the cartridge and to move it and the flow cell to the Y-direction reference position. With the cartridge and flow cell thus properly positioned, at 212 the vacuum chuck may be actuated to exert a hold-down force on the lower side of the flow cell, as described. Thereafter, the main motors on both assemblies are further actuated to move the clamp arms to their clamped positions at which they contact the flow cell, the cartridge or both to exert a clamping and hold-down force. This motion also causes the manifolds to be released to their biased engaged positions to make the desired sealed fluid connections to the flow cell. The assemblies remain in this orientation throughout the processing of the flow cell. The entire process may be reversed for release cartridge and flow cell, which may then be freely removed from the system.

It may be noted that the securement of the flow cell, the location of the flow cell to the X-direction reference position, the location of the flow cell to the Y-direction reference position, and the engagement of the flow cell to the sealed fluid connections is performed in a single, automated securement operation. That is, once the engagement, locating, and securement operations are initiated, the operations are performed in an automated operation that does not require further intervention. In the illustrated embodiment this is performed by engagement or energizing three motors, the two main motors on the common- and post-sides for moving to the "hover" and clamped positions and for moving the flow cell to the X-direction reference position, and for releasing the manifolds, and the third motor on the one side only for moving the flow cell to the Y-direction reference position. The order of some of the operations may be altered, of course, as may certain of the structures without deviating from the single-operation approach outlined.

It may also be noted that in the illustrated embodiment the final engagements for securement, positioning, and fluid connections are stable and biased by springs. Indeed, the structure is stable in all three positions described, open, hover, and clamped. This is particularly advantageous insomuch as no motors need to be energized or active during sequencing, reducing the chance of movement or shaking due to vibrations that could be induced by the motors.

The components of the assemblies described above may be made of any suitable materials, and most of the mechanical parts (other than elements such as bearings and springs) maybe molded and/or molded and machined to their final configuration. However, certain materials may be desirable for making in certain of the components. For example, to reduce friction some of the parts may be made of or coated with a friction-reducing material. In the illustrated embodiment, for example, the clamp shaft and helical cam may be coated with a polymer, for example a polytetrafluoroethylene (PTFE) coating. In the same embodiment, the clamps themselves may be made of a PTFE-impregnated hard anodized material, particularly to provide for ease of displacement along the shaft (particularly the bores of the clamp parts). The hard anodized material may be, for example, a metal, a ceramic, or a composite thereof. Moreover, at least some of the housing parts may be made of a material that insulates the structures somewhat, such as a polymer such as polyether ether ketone (PEEK). In this embodiment, because the vacuum chuck may be heated and cooled to control the temperature of the flow cell, the use of such materials reduced the effect of the securement structures on the flow cell temperature regulation.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The invention claimed is:

1. A system comprising:
    a support configured to receive a flow cell assembly, the support comprising an X-direction locator element;
    a common-side securement assembly having a first arm;
    a post-side securement assembly having a second arm, the first and second arms actuatable to draw the flow cell assembly into engagement towards the support in a Z-direction to a plane of the flow cell assembly, the common-side securement assembly positioned on a first side of the support and the post-side securement assembly positioned on a second side of the support, the second side opposite the first side;
    a first driving element actuatable to urge the flow cell assembly into a first reference position in an X-direction perpendicular to the Z-direction against the X-direction locator element;
    a second driving element actuatable to urge the flow cell assembly into a second reference position in a Y-direction perpendicular to the Z-direction and to the X-direction against a Y-direction locator element; and
    an actuating system operatively connected to the arms, the first driving element and the second driving element and configured to, in a single securement operation, actuate the arms to draw the flow cell assembly towards the support in the Z-direction, actuate the first driving element to urge the flow cell assembly into the first reference position against the X-direction locator element in the X-direction, and actuate the second driving element to urge the flow cell assembly into the second reference position against the Y-direction locator element in the Y-direction.

2. The system of claim 1, further comprising fluid connections configured to form a sealed fluid flow path with the flow cell assembly when the flow cell assembly is positioned in the first and second reference positions.

3. The system of claim 2, wherein the fluid connections comprise manifolds that are moveable by the actuating system to complete sealed fluid connections with an inlet side of the flow cell assembly and an outlet side of the flow cell assembly.

4. The system of claim 3, wherein the manifolds comprise a first manifold configured to fluidically couple with a first elastomeric element of the flow cell assembly for sealing more than one flow path.

5. The system of claim 2, wherein the fluid connections comprise manifolds configured to be positioned relative to inlet and outlet sides of the flow cell assembly.

6. The system of claim 5, comprising springs; wherein the manifolds are spring-biased upwardly via the springs against a force exerted by the arms.

7. The system of claim 1, wherein the first arm is configured to contact an upper side of the flow cell assembly on an inlet side of the flow cell assembly, and the second arm is configured to contact the upper side of the flow cell assembly on an outlet side of the flow cell assembly.

8. The system of claim 1, wherein the actuating system includes a pair of electric motors for moving the flow cell assembly towards the first reference position, and a third motor for moving the flow cell towards the second reference position.

9. The system of claim 1, wherein the arms and the first and second driving elements are each configured to contact at least one of a frame structure of the flow cell assembly or a flow cell of the flow cell assembly when actuated by the actuating system when the flow cell assembly is received by the support.

10. The system of claim 1, wherein the first driving element comprises a helical surface configured to urge the flow cell assembly towards the first reference position.

11. The system of claim 1, comprising biasing springs, wherein the arms are biased in a clamped position by the biasing springs.

* * * * *